(12) United States Patent
Wong et al.

(10) Patent No.: US 12,470,935 B2
(45) Date of Patent: Nov. 11, 2025

(54) INFORMATION HANDLING SYSTEM WIRELESS NON- DISPLAY PERIPHERAL HAVING LEVEL FOUR SECURITY

(71) Applicant: Dell Products L.P., Round Rock, TX (US)

(72) Inventors: Kai Leong Wong, Singapore (SG); Manish K. Desai, Singapore (SG); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 418 days.

(21) Appl. No.: 17/948,467

(22) Filed: Sep. 20, 2022

(65) Prior Publication Data

US 2024/0098501 A1 Mar. 21, 2024

(51) Int. Cl.
| | | |
|---|---|---|
| G06F 7/04 | (2006.01) | |
| G06F 3/023 | (2006.01) | |
| G06F 3/0354 | (2013.01) | |
| G06F 3/038 | (2013.01) | |
| G06F 15/16 | (2006.01) | |
| H04L 29/06 | (2006.01) | |
| H04W 12/037 | (2021.01) | |
| H04W 12/50 | (2021.01) | |
| H04W 76/14 | (2018.01) | |

(52) U.S. Cl.
CPC .......... *H04W 12/50* (2021.01); *G06F 3/0231* (2013.01); *G06F 3/03543* (2013.01); *G06F 3/038* (2013.01); *H04W 12/037* (2021.01); *H04W 76/14* (2018.02); *G06F 2203/0384* (2013.01)

(58) Field of Classification Search
CPC ... H04W 12/50; H04W 12/037; H04W 76/14; G06F 3/03543; G06F 3/038
USPC .......................................................... 726/4
See application file for complete search history.

(56) References Cited

U.S. PATENT DOCUMENTS

| | | | |
|---|---|---|---|
| 8,225,094 | B2 | 7/2012 | Willey |
| 8,260,261 | B2 | 9/2012 | Teague |
| 9,210,733 | B2 | 12/2015 | Russell et al. |
| 9,351,154 | B1 * | 5/2016 | Steve ...................... H04W 4/80 |
| 10,419,458 | B2 | 9/2019 | Mosovici et al. |
| 10,733,115 | B2 | 8/2020 | Tan et al. |
| 2005/0085934 | A1 | 4/2005 | Jin |

(Continued)

FOREIGN PATENT DOCUMENTS

EP 2148262 A2 1/2010

*Primary Examiner* — Jeffrey C Pwu
*Assistant Examiner* — Samuel Ambaye
(74) *Attorney, Agent, or Firm* — Zagorin Cave LLP; Robert W. Holland

(57) ABSTRACT

An information handling system and peripheral mouse establish level four security when a preloaded security identification packet is available to securely identify both devices for the exchange of pairing information in a manner that avoids man-in-the-middle attacks. The peripheral advertises with both a BLE protocol packet that supports a conventional level 3 security pairing and a secure identification packet that supports a level four security pairing. When the secure identification packet advertisement is selected by a host, the BLE profile may be populated without performing pairing so that the profile can be used to subsequently pair without risk of a malicious device imitating the BLE interface.

19 Claims, 3 Drawing Sheets

(56) References Cited

U.S. PATENT DOCUMENTS

| | | | |
|---|---|---|---|
| 2007/0032195 | A1 | 2/2007 | Kurisko et al. |
| 2009/0112339 | A1 | 4/2009 | Huang et al. |
| 2011/0126005 | A1 | 5/2011 | Carpenter et al. |
| 2013/0031377 | A1 | 1/2013 | Sultenfuss et al. |
| 2014/0075075 | A1 | 3/2014 | Morrill et al. |
| 2014/0273845 | A1 | 9/2014 | Russell et al. |
| 2014/0307607 | A1 | 10/2014 | Clark et al. |
| 2014/0378055 | A1 | 12/2014 | Pal et al. |
| 2015/0105014 | A1 | 4/2015 | Kulavik et al. |
| 2016/0285524 | A1 | 9/2016 | Liu et al. |
| 2018/0020829 | A1 | 1/2018 | Vier |
| 2020/0374954 | A1 | 11/2020 | Chen |
| 2020/0382954 | A1* | 12/2020 | Chazot ............... H04L 9/14 |
| 2021/0034132 | A1* | 2/2021 | Hamlin ............ G06F 1/3287 |
| 2021/0234767 | A1 | 7/2021 | Ricci |
| 2022/0312328 | A1* | 9/2022 | Krishnakumar ...... G06F 3/02 |
| 2022/0361266 | A1 | 11/2022 | Ahmed |

* cited by examiner

INFORMATION HANDLING SYSTEM WIRELESS NON- DISPLAY PERIPHERAL HAVING LEVEL FOUR SECURITY

BACKGROUND OF THE INVENTION

Field of the Invention

The present invention relates in general to the field of information handling system wireless peripherals, and more particularly to an information handling system wireless non-display peripheral having level four security.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that cooperate to process information based upon inputs from an end user and typically for presentation at a display. For example, a central processing unit (CPU) executes an operating system and applications in cooperation with a random access memory (RAM) to generate visual images for presentation at a display. An end user interacts with the CPU through input/output (I/O) devices, such as a keyboard and mouse. Desktop information handling systems typically accept end user inputs through a peripheral keyboard and mouse. Portable information handling systems generally integrate a keyboard and touchpad in a portable housing to accept inputs and also interface with peripheral devices, such as peripheral keyboard and mouse. Although the peripheral devices can couple through a cable interface, cables tend to clutter a desktop area. Instead, end users tend to prefer wireless peripheral devices for their convenience and to eliminate desktop clutter. Various wireless protocols are available to support different types of peripherals based upon the expected range and bandwidth of the peripheral's communications. For example, BLUETOOTH LOW ENERGY (BLE) protocol offers a low data rate and low power use option for peripherals like a keyboard and mouse. Other wireless protocols might include 802.11 protocols generally known as WiFi and 60 GHz protocols likeWiGig. For instance, peripheral displays and headphones can also interface through wireless protocols.

One difficulty with the use of wireless protocols for communication with peripheral devices is that wireless signals may be received by any device within range, putting the security of the information at risk. In addition, any transmitter in range may communicate with a peripheral device to provide inaccurate information as inputs. To prevent malicious interactions with a wireless peripheral, most wireless protocols offer some sort of encryption to secure the wireless signals. BLE has a level three encryption that is set up at initial pairing between a host, such as an information handling system, and a peripheral, such as a keyboard or mouse. During the initial pairing an encrypted handshake is performed to generate a key at each of the host and peripheral so that all subsequent communications are secured. The trouble with level three encryption is that a malicious intermediary within range of a pairing operation can perform a man in the middle attack (MITM). This type of attack involves the intermediary radio imitating both the peripheral and host so that communication of the key takes place through the intermediary radio. Once the intermediary device has the key, it can not only listen to communications between the host and peripheral but also insert malicious information.

To prevent MITM type attacks, BLE has a level four security that involves each side of the secured link to uniquely identify itself during the initial pairing. The level four key setup generally involves an end user input at one of the devices to ensure that communication is from the device instead of an intermediary device. For instance, a level four secure pairing for a keyboard might involve presentation at the host information handling system display of a number that the keyboard has to input to verify the device identify. As a result, level four security is typically only available with devices that have a display and keys available to input the unique identifier during the pairing process. Generally, non-display devices, such as a mouse or headset, cannot perform conventional level four security pairing and operate at level three instead.

SUMMARY OF THE INVENTION

Therefore, a need has arisen for a system and method which establish a level four security interface for non-display devices.

In accordance with the present invention, a system and method are provided which substantially reduce the disadvantages and problems associated with previous methods and systems for establishing a wireless protocol pairing that protects against man-in-the-middle attacks. The peripheral advertises both a wireless protocol packet and a secure identification packet. When a host can support the secure identification packet, pairing information is exchanged with encrypted communications that positively identifies both devices to thwart man-in-the-middle type attacks.

More specifically, an information handling system processes information with instructions executing on a processor in cooperation with a memory, such as an operating system and applications. The information handling system includes a wireless network interface controller (WNIC) to support wireless communications with external devices and networks, such as wireless local area networks (WLAN) and wireless personal area networks (WPAN) like the BLUETOOTH and BLE protocols. A wireless peripheral, such as a mouse, advertises to initiate pairing to the information handling system as host with a wireless protocol having dual identification confirmation as part of the initial pairing process. For instance, the peripheral advertises a conventional BLE packet alternating with a security identification packet. When the information handling system cannot support the security identification packet, the peripheral is available for a conventional level three security interface. When the information handling system can support the security identification packet, a secure interface is established without pairing to exchange level four pairing parameters and then a BLE interface is established with the level four security pairing parameters.

The present invention provides a number of important technical advantages. One example of an important technical advantage is that a BLE level four security is provided to non-display peripheral devices, such as mouse. The level four security is offered without a need for an end user input during initial pairing, such as manual input of a code presented at a display. When the level four security is not available, such as due to the lack of a secure identification packet, level three security is performed. Although the level four security is available for non-display devices, the automated manner of the pairing without an intervening end user input of a displayed code takes place in a more rapid manner than a conventional level four BLE interface so that, when available, it may be preferred to the conventional level four pairing with display devices, such as keyboard.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system and peripheral perform level four BLE security pairing without an identification input by an end user during the pairing to confirm a device identity for protection against man in the middle attacks. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
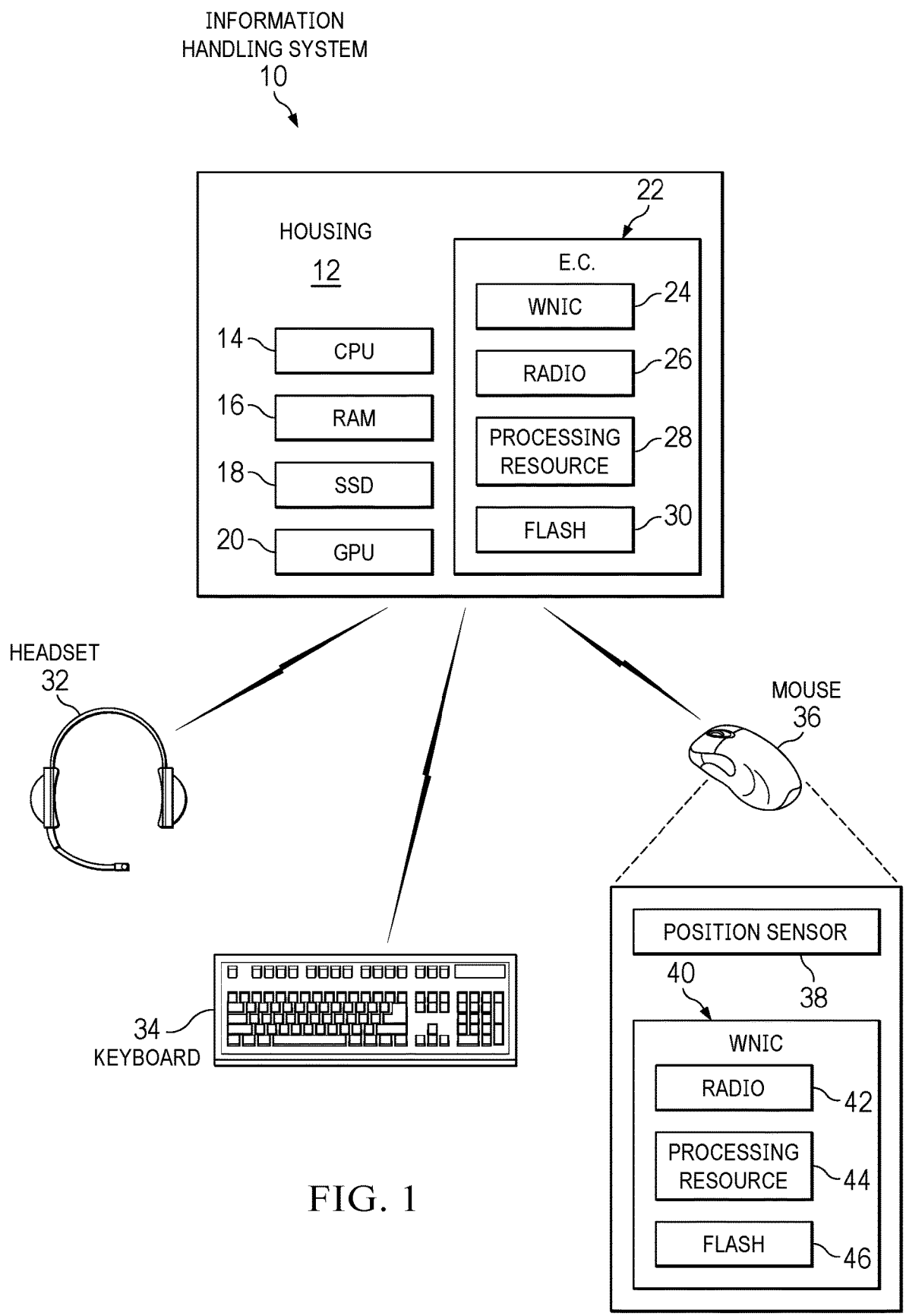
FIG. 1 depicts a block diagram of an information handling system and peripheral, such as a mouse, configured to perform level four BLE security pairing without identification information presented at a display to input through the peripheral.

Referring now to FIG. 1, a block diagram of an information handling system 10 and a peripheral, such as a mouse 36, configured to perform level four BLE security pairing without identification information presented at a display to input through the peripheral. Information handling system 10 in the example embodiment is a desktop system having a fixed housing 12 that contains processing components to cooperate to process information. A central processing unit (CPU) 14 executes instructions to process information in cooperation with a random access memory (RAM) 16 that stores the instructions and information. A solid state drive (SSD) 18 provides persistent storage of instructions and information, such as an operating system and applications. A graphics processing unit (GPU) 20 further processes information to generate visual images for presentation at a display, such as pixel values. An embedded controller 22 manages physical operations of the information handling system, such as the application of power, maintenance of thermal constraints and interactions with I/O devices. A wireless network interface controller (WNIC) 24 supports interactions with external networks and devices, such as through WIFI and BLUETOOTH. In the example embodiment, WNIC 24 includes a radio 26, processing resource 28 and flash memory 30 that support wireless signal communications through a variety of different protocols. In the present disclosure, the wireless communications are by wireless personal area network (WPAN) communications, such as BLUETOOTH. In alternative embodiments, the present disclosure may support other types of wireless signal communications, such as wireless local area network (WLAN) communications.

In the example embodiment, three different types of peripheral devices communicate by wireless signals with information handling system 10: a headset 32 that plays audio; a keyboard 34 that accepts keyed inputs; and a mouse 36 that accepts inputs a movements and button presses. Mouse 36 includes a position sensor 38 that tracks the mouse position as it moves on a support surface. The change in position and any button presses are communicated by wireless signals from a mouse WNIC 40 that includes a radio 42, processing resource 44 and flash memory 46. In the example embodiment, flash memory 46 stores instructions and information applied by processing resource 44 to establish a secure wireless link with WNIC 24 of information handling system 10, such as with the BLE protocol. On an initial interface, WNIC 24 and WNIC 40 perform a pairing process to establish a secure key that the information handling system and peripheral use to communicate with encrypted wireless signals. The BLE initial pairing process includes level three security for mouse 36 and headset 32 and level four security for keyboard 34. To achieve level four security for keyboard 34, WNIC 24 presents at a display of information handling system 10 a code that keyboard 34 can type in so that the identity of keyboard 34 is confirmed to prevent a man-in-the-middle attack. Headset 32 and mouse 36 lack the ability to input the code presented at the display for a conventional BLE level four security key pairing process.

In order to achieve level four security that prevents a man-in-the-middle attack, mouse 36 and information handling system 10 include an independent identification security packet exchange so that positive identification is made without the input by the peripheral of a code presented at a display. The identification security packet availability is advertised from the peripheral in an alternating pattern with conventional BLE advertisement so that a host can select whether to perform a conventional level three BLE pairing or interface through the identification security packet to perform a level four BLE pairing. The level four BLE pairing may be performed in a number of ways. In one embodiment, the host establishes communication with the peripheral using the identification security packet so that all communications are encrypted and unavailable to attack by a man-in-the-middle. During the encrypted communications and without actually pairing, the host and peripheral share BLE pairing information that includes the generation of a secure key, such as by sharing a GATT profile. Once the BLE pairing information is exchanged and the secure key generated, the host and peripheral establish a BLE interface with the secure key so that no unencrypted communications are available to attack. As an alternative, the identification security packet provides a basis to encrypt the entire BLE pairing process so that a conventional BLE pairing may take place without any unencrypted communications. In either event, the creation of the BLE key is performed with secured communications that positively identify both the host and peripheral to thwart man-in-the-middle attacks.

Figure 2:
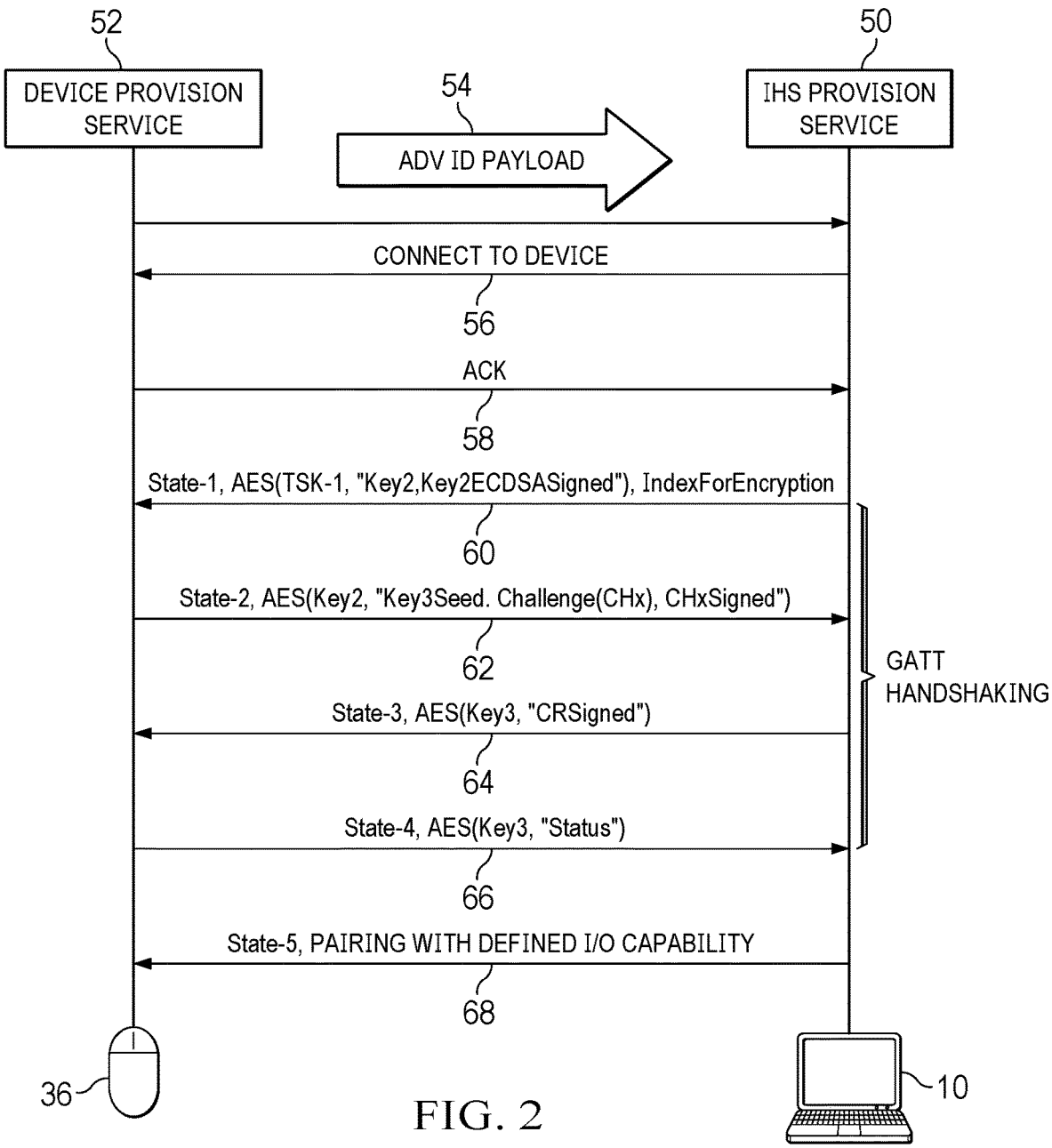
FIG. 2 depicts a flow diagram of a process for establishing level four BLE security with a non-display device.

Referring now to FIG. 2, a flow diagram depicts a process for establishing level four BLE security with a non-display device. The flow diagram depicts wireless communications between an information handling system 10 provision service 50 and a peripheral device, such as a mouse 36, provision service 52. The process starts at step 54 with the peripheral device advertising a security identification packet that is received by the information handling system. The security identification packet is a unique payload that is preferably transmitted at a low power to work with close proximity pairing, such as less than 30 cm. The information handling system provisioning service confirms the unique payload with a signature tag and at step 56 requests to connect to the peripheral device to discover the peripheral device available services. At step 58, the peripheral device acknowledges the request, however, no BLE pairing is performed. The information handling system provisioning service interfaces with the peripheral device provision service to discover a custom security service stored as a GATT Service. The custom security service provides a unique identifier that supports an exchange of encrypted keys without the risk of a man-in-the-middle attack. In the example embodiment, the establishment of the unique identifier and key is used under the custom service to populate a BLE pairing service without actually performing BLE pairing. After the BLE service is populated, the BLE key may be used to communicate without risk of a man-in-the-middle attack. As an alternative, once the custom service generates the secure key, the secure key may be used at any point to perform conventional BLE provisioning in a secure manner. In such a scenario, the custom service may, in part, resolve the level four security step of a displayed code input by an opposing device by prepopulating the code response in the peripheral device and automatically responding with the code when needed. Alternatively, the BLE service is populated to indicate that the code was input.

At step 60, once the peripheral has acknowledged the availability of the custom service, the process continues to perform a State 1 of the custom provisioning service in which the information handling system provision service sends a signed key2 as identity proof and next encryption key 2 with a variant of ECDH sharedkey scheme TSK-1 to establish an index for encryption. State 1 is designed to prevent the man-in-the middle attack since no public key is exchanged before confirmation of device identity. The information handling system calculates a sharedkey with prepopulated device DevECCPubKey1 so that a SecureHash derived from the SharedKey is used to encrypt State 1 contents and avoid a direct brute force reverse engineering attack.

At step 62, the peripheral device custom service performs a State 2 with the peripheral device validated information handling system identity used to send an encrypted challenge CHx device ECDSA-signed of CHx to the information handling system. The design intent of State 2 is to use a session based mutual identity authentication to lockout a man-in-the-middle attack. The peripheral devices send identifying proof by signing the challenge so that the information handling system provision service can trust a genuine credential challenge from the peripheral device. The information handling system provision service is able to perform the response based upon the shared secret of the custom service. More specifically, encrypted communication for States 1, 2 and 3 rely upon Chain Key Encryption that uses a different encryption key at each communication to safeguard the shared information for pairing by having no more than two data point established to form a basis for reverse engineering. At step 62 the peripheral sends encrypted contents to the information handling system with encryption key2, where the encrypted contents include a challenge (CHx), a key seed for the next encryption usage at State 3 and ECDSA signed CHx.

At step 64 a State 3 of the secure custom service is performed with the information handling system responding with an AES key3 having a CRSigned encryption. At State 3, the information handling system verifies its identity by calculating a challenge response with an ECDSA-signed challenge response and sends the encrypted response to the peripheral device. The design intent of State 3 is to provide on top of encryption protection so that no complete data set of a digest and signature is available for reverse engineering. Air sniffing cannot reverse engineer with the signature without a target digest. As is described above, the information handling system uses the State 2 provide key3 seed to generate a new key. The information handling system is encrypting by AES-CCM the CRSigned ECDSA signed Challenge Response with key3. AES-CCM of key3 and data is interpreted as encrypting data with the AES-CCM method and encryption key3.

At step 66, a State 4 of the secure custom service provides a response from the peripheral devices with AES Key3 and a status of the peripheral device. The peripheral is encrypting the status with Key3. The peripheral device issues a status of verification so that both the host and peripheral custom services can start calculation of a final passcode entry. A complicated secure hash loop is used to derive a passcode entry based on the session key, internal constants, keys, challenge response, and signed challenge response. The design intent of State 4 is to provide on top of authenticated encryption protection so that air sniffing not collecting all data cannot derive the passcode entry.

At step 68, a State 5 of the secure custom service is performed to establish BLE pairing with a defined I/O capability. At State 5, the peripheral device declares a BLE I/O capability as "display" and the information handling system declares "keyboard" to force a BLE secure password entry pairing. The design intent is to enable noninput/nondisplay devices to pick their own passcode entry to appear as if a display to user passcode was provided. This allows the peripheral device to enjoy a level four BLE security passcode entry authentication without physically having a real display. The information handling system provisioning service submits the passcode keyboard entry to the operating system for pairing with passcode entry. The peripheral will submit the internally derived passcode to the device Bluetooth stack for passcode entry pairing with the display.

Figure 3:
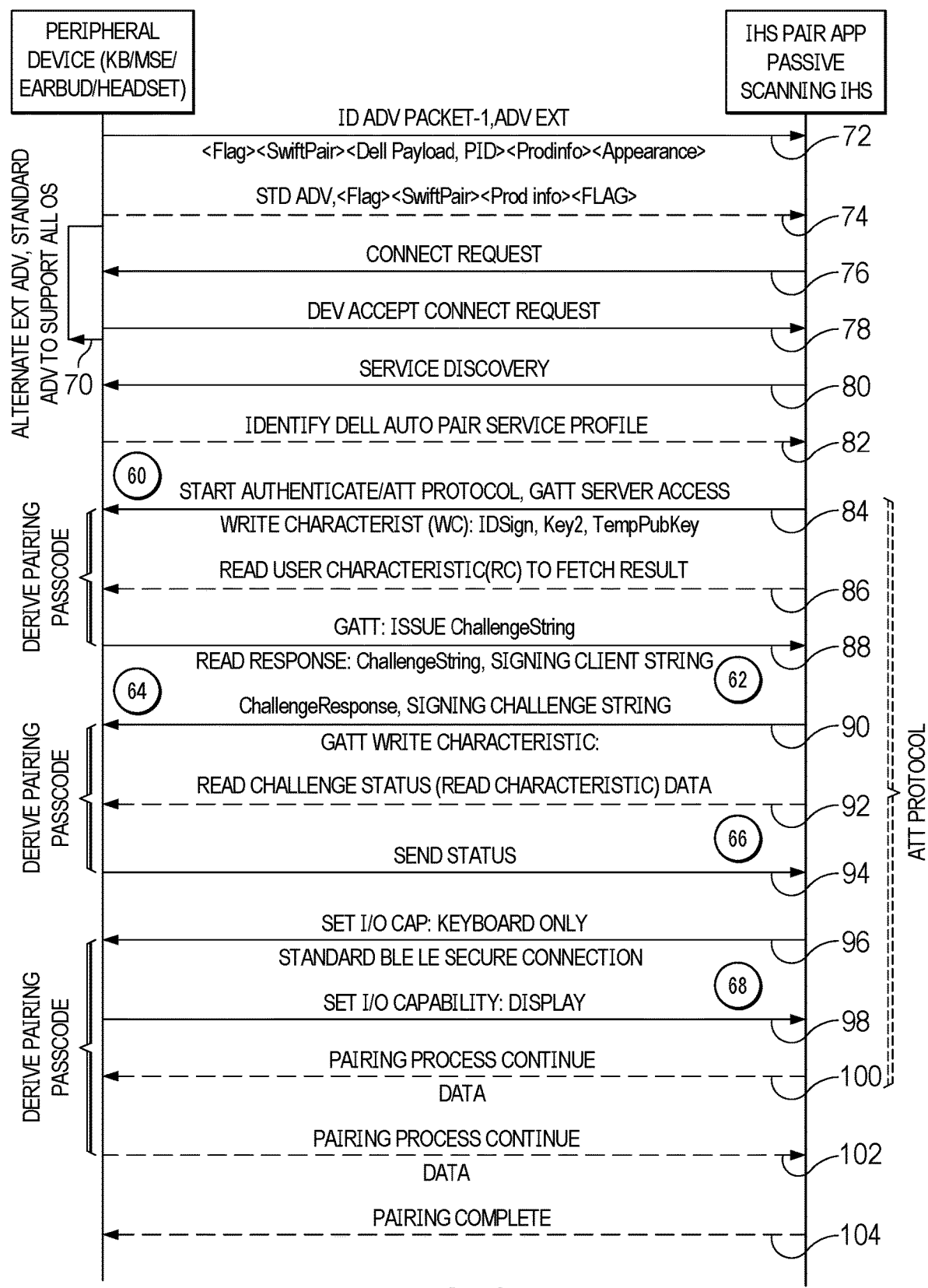
FIG. 3 depicts a flow diagram of a process to pair at level four security indicating the transmissions by the host and peripheral.

Referring now to FIG. 3, a flow diagram depicts a process to pair at level four security indicating the transmissions by the host and peripheral. At step 70 the peripheral performs advertisement that alternates between the secure identification packet at step 72 and the standard BLE packet at step 74, such as with every other transmission. In one example embodiment, the secure identification packet may be transmitted at a lower power setting. In alternative embodiments, different rates of interleaving the secure identification packet and BLE packet may be used, such as every third or fifth transmission. At step 76 the host transmits a connect request. At step 78 the peripheral accepts the connect request. At step 80, the host initiates the custom service discovery without performing BLE pairing. At step 82 the peripheral responds to the service discovery by providing the custom service profile to the host. At step 84, the host initiates State 1 of step 60 from FIG. 2 by starting authentication/ATT protocol GATT server access, such as with a write characteristic of the ID sign, key2 and temporary pubic key. At step 86 the host reads the result with a read characteristic. At step 88 a GATT issue challenge string is communicated from the peripheral to achieve State 2 associated with step 62 of FIG. 2, such as with read response of the challenge string and signing of the client string.

At step 90, the host communicates the challenge response and signing challenge string with a GATT write characteristic to the peripheral to achieve State 3 corresponding to step 64 of FIG. 2. At step 92 the host reads the challenge status with a read characteristic and the peripheral sends the status at step 94 to achieve State 4 corresponding with step 66 of FIG. 2. At step 96, the host sets the I/O status to keyboard only to provide a standard BLE secure connection having level four security. At step 98, the peripheral responds by setting the I/O capability to display so that State 5 at step 68 of FIG. 2 is achieved and level four security capability is confirmed. At step 100 the host continues the pairing process using the secure interface with the peripheral providing pairing data in response at step 102. At step 104 pairing is complete with the host and peripheral sharing a level four secure interface.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory interfaced with the processor and operable to store the instructions and information;
   a display interfaced with the processor and operable to present the information as visual images;
   a host radio interfaced with the processor and operable to communicate by wireless signals with a wireless protocol, the host radio having a host processing resource and a host non-transient memory storing host instructions that execute on the host processing resource to pair with an external device by secure identification having a code presented at the display and input to the external device during the pair for communication to the host radio by a radio of the external device; and
   a peripheral having an input interface operable to accept end user inputs and a peripheral radio operable to communicate the end user inputs to the host radio, the peripheral radio having a peripheral processing resource and a peripheral non-transient memory storing peripheral instructions that execute on the peripheral processing resource to pair with the host radio by secure identification including the input to the host radio during the pair for confirmation of the peripheral identity;
   wherein the host instructions and the peripheral instructions cooperate to simulate the secure identification including the input during the pairing;
   wherein:
   the peripheral instructions cause transmission of a wireless protocol advertisement packet and a peripheral identification packet; and
   the host instructions cause monitoring for both the wireless protocol advertisement packet and the peripheral identification packet.

2. The information handling system of claim 1, wherein the peripheral instructions cause the wireless protocol advertisement packet and the peripheral identification packet to interleave at a predetermined rate.

3. The information handling system of claim 2, wherein the predetermined rate is every other transmission during advertisement.

4. The information handling system of claim 1, wherein the host instructions cause:
   establishing a wireless interface by reference to the peripheral identification packet without pairing with the peripheral; and
   communicating with the wireless interface the identifier information in an encrypted form to the peripheral to establish the pairing with the secure identification.

5. The information handling system of claim 4, wherein the pairing is established by exchanging pairing information without performing pairing under the wireless protocol.

6. The information handling system of claim 4, wherein the pairing is established by exchanging pairing information using the wireless protocol and encrypting communications in the wireless protocol by reference to the identifier information.

7. The information handling system of claim 4, wherein the peripheral is a mouse.

8. The information handling system of claim 4, wherein the peripheral is a keyboard.

9. A method for pairing an information handling system and a peripheral, the method comprising:
   transmitting from the peripheral both a wireless protocol advertisement packet and secure peripheral identification packet;
   monitoring at the information handling system for both the wireless protocol advertisement packet and the peripheral identification packet;
   when the information handling system responds to the wireless protocol advertisement, performing a secure pairing at a first security level in accordance with the wireless protocol; and
   when the information handling system responds to the secure peripheral identification packet, exchanging encrypted pairing information for the wireless protocol to establish pairing at a second security level in accordance with the wireless protocol.

10. The method of claim 9, further comprising:
establishing an encrypted interface with the secure peripheral identification packet; and
using the encrypted interface to perform the wireless protocol pairing according to the wireless protocol.

11. The method of claim 10, further comprising:
simulating a keyboard input at the peripheral to complete the wireless protocol pairing by communication to the information handling system.

12. The method of claim 9, further comprising:
establishing an encrypted interface with the secure peripheral identification packet; and
populating a wireless protocol profile at the peripheral with the encrypted interface and without pairing according to the wireless protocol.

13. The method of claim 12, further comprising:
applying the wireless protocol profile to pair the peripheral and information handling system with the second security level.

14. The method of claim 9, wherein the peripheral comprises an audio device.

15. The method of claim 9, wherein the peripheral comprises a mouse.

16. The method of claim 9, wherein the peripheral comprises a keyboard.

17. A peripheral comprising:
a processing resource;
a sensor interfaced with the processing resource, the sensor operable to detect end user inputs;
a radio interfaced with the processing resource and operable to communicate the end user inputs by a wireless protocol; and
a non-transient memory storing instructions that when executed on the processing resource cause:
transmission from the peripheral of both the wireless protocol advertisement packet and a secure peripheral identification packet;
wherein the information handling system monitors for both the wireless protocol advertisement packet and the secure peripheral identification packet;
when the information handling system responds to the wireless protocol advertisement, performing a secure pairing at a first security level in accordance with the wireless protocol; and
when the information handling system responds to the secure peripheral identification packet, exchanging encrypted pairing information for the wireless protocol to establish pairing at a second security level in accordance with the wireless protocol.

18. The peripheral of claim 17, wherein the instructions further cause:
establishing an encrypted interface with the secure peripheral identification packet; and
populating a wireless protocol profile at the peripheral with the encrypted interface and without pairing according to the wireless protocol.

19. The peripheral of claim 17, wherein the instructions further cause:
establishing an encrypted interface with the secure peripheral identification packet; and using the encrypted interface to perform the wireless protocol pairing according to the wireless protocol.

\* \* \* \* \*